United States Patent
Ren et al.

(10) Patent No.: US 11,678,067 B1
(45) Date of Patent: Jun. 13, 2023

(54) SYSTEM AND METHOD FOR MAINTAINING PIXEL INTENSITY WHEN ROUNDING

(71) Applicant: OmniVision Technologies, Inc., Santa Clara, CA (US)

(72) Inventors: Yiyi Ren, Santa Clara, CA (US); Wenshou Chen, Santa Clara, CA (US); Guansong Liu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/674,564

(22) Filed: Feb. 17, 2022

(51) Int. Cl.
  *H04N 25/46* (2023.01)
  *H04N 25/75* (2023.01)
  *G06T 3/40* (2006.01)
  *H04N 23/80* (2023.01)

(52) U.S. Cl.
  CPC .............. *H04N 23/80* (2023.01); *G06T 3/40* (2013.01); *H04N 25/46* (2023.01); *H04N 25/75* (2023.01)

(58) Field of Classification Search
  CPC ........ H04N 23/80; H04N 25/46; H04N 25/75; G06T 3/40–4092
  See application file for complete search history.

(56) References Cited

U.S. PATENT DOCUMENTS

| | | | | |
|---|---|---|---|---|
| 2012/0236187 A1* | 9/2012 | Guthrie | ............... | H04N 25/443 348/294 |
| 2014/0218567 A1* | 8/2014 | Han | ................... | H04N 23/741 348/239 |
| 2016/0286108 A1* | 9/2016 | Fettig | .................. | H04N 25/704 |
| 2020/0322549 A1* | 10/2020 | Lin | ....................... | H04N 23/84 |

\* cited by examiner

*Primary Examiner* — Lin Ye
*Assistant Examiner* — Chriss S Yoder, III
(74) *Attorney, Agent, or Firm* — Cozen O'Connor

(57) ABSTRACT

An image sensor processor implemented method for retaining pixel intensity, comprising: receiving, by the image processor, a numerical value indicative of a corresponding pixel intensity; determining, by the image processor, whether a least significant portion of the received numerical value is equal to a predetermined numerical value; and responsive to determining the least significant portion of the received numerical value is equal to the predetermined numerical value, rounding, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and binning the rounded value.

15 Claims, 10 Drawing Sheets

| Floating number: x | 65.25 | 65.75 | 66.5 | 64.5 | 65.00 | 66.00 | 65.00 | 67.75 | 67.5 | 67.25 | 64.5 | 65.00 | 65.25 | 65.70 | 64.5 | 65.75 | 64.25 | 63.5 |
|---|---|---|---|---|---|---|---|---|---|---|---|---|---|---|---|---|---|---|
| Output of Counter (i) | NA | NA | 1 | 2 | NA | NA | NA | NA | 3 | NA | 4 | NA | NA | NA | 5 | NA | NA | 6 |
| Output s[n] | NA | NA | 0 | 1 | NA | NA | NA | NA | 0 | NA | 1 | NA | NA | NA | 0 | NA | NA | 1 |
| Final output | 65 | 66 | 66 | 65 | 65 | 66 | 65 | 69 | 67 | 67 | 65 | 65 | 65 | 66 | 64 | 66 | 64 | 64 |

SYSTEM AND METHOD FOR MAINTAINING PIXEL INTENSITY WHEN ROUNDING

BACKGROUND

Camera modules in commercial products such as stand-alone digital cameras, mobile devices, automotive components, and medical devices include an image sensor having a pixel array. The pixel array includes a plurality of pixels arranged as an N×N array. Pixel intensity is a critical feature used for classifying information stored within pixels. The intensity of a pixel is typically represented as a numerical value for gray-level images or three numerical values for color images. An N×N pixel group of a pixel array may be binned to form superpixels by, for example, averaging pixel intensities of each pixel within the N×N pixel array. Maintaining consistent pixel intensity values during binning is critical to maintaining an accurate image for display. Pixel binning leads to a higher signal-to-noise ratio at the expense of lowering overall resolution.

SUMMARY

According to an embodiment, an image sensor processor implemented method for retaining pixel intensity, comprising: receiving, by the image processor, a numerical value indicative of a corresponding pixel intensity; determining, by the image processor, whether a least significant portion of the received numerical value is equal to a predetermined numerical value; and responsive to determining the least significant portion of the received numerical value is equal to the predetermined numerical value, rounding, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and binning, by the image processor, the rounded value.

According to another embodiment, a camera system, comprising a module that includes an image sensor processor, a memory communicatively coupled with the image sensor processor, the memory storing machine-readable instructions that, when executed by the image sensor processor, cause the image sensor processor to: receiving, by the image processor, a numerical value indicative of a corresponding pixel intensity; determining, by the image processor, whether a least significant portion of the received numerical value is equal to a predetermined numerical value; responsive to determining the least significant portion of the received numerical value is equal to the predetermined numerical value, rounding, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and binning, by the image processor, the rounded value.

According to another embodiment, an image sensor processor implemented method for retaining pixel intensity, comprising: receiving, by an image processor, a set of numerical values indicative of corresponding pixel intensities read from an image sensor; binning, by the image processor, by a method comprising rounding the set of numerical values according to a rounding algorithm further comprising: determining, by the image processor, for each numerical value, whether a least significant portion of each numerical value is equal to a predetermined numerical value; and responsive to determining the least significant portion of each numerical value is equal to the predetermined numerical value, rounding, by the image processor, each numerical value of the corresponding pixel intensities to a higher or lower value depending on a bit sequence, and if the least significant portion of the numerical value is not equal to the predetermined value, rounding the numerical value to the higher or lower value based on the numerical value; and averaging the rounded numerical values to produce binned values; and storing, by the image processor, the binned values.

BRIEF DESCRIPTION OF THE FIGURES

FIG. 7 shows rounding of floating number values using the present embodiments, according to embodiments.

DETAILED DESCRIPTION OF THE EMBODIMENTS

Figure 1A:
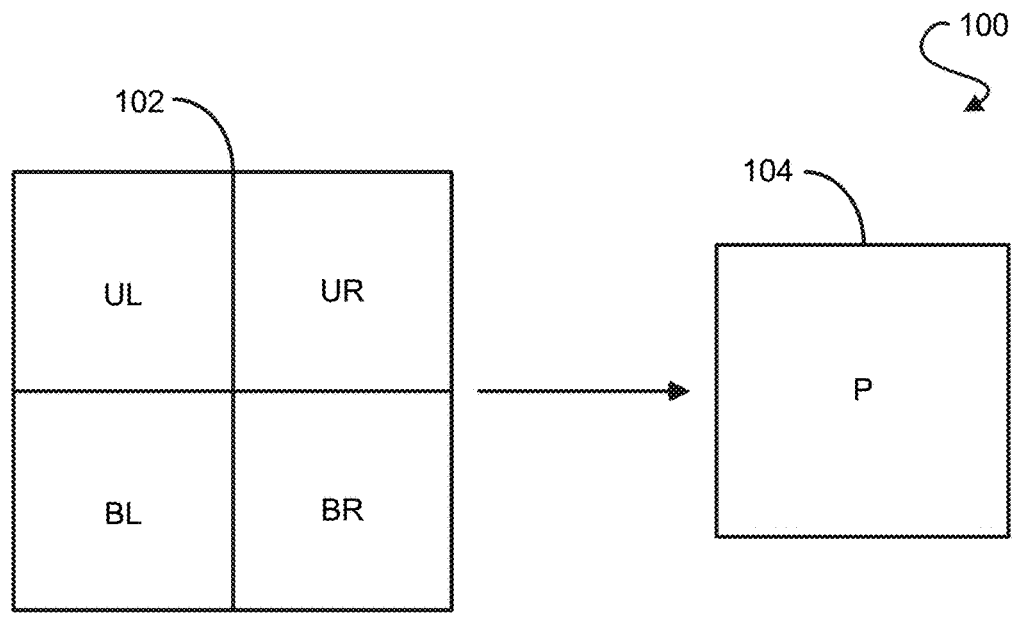
FIG. 1A shows a diagram of a process of binning pixel intensities from a 2×2 pixel array to a single super pixel, according to embodiments.
Figure 1B:
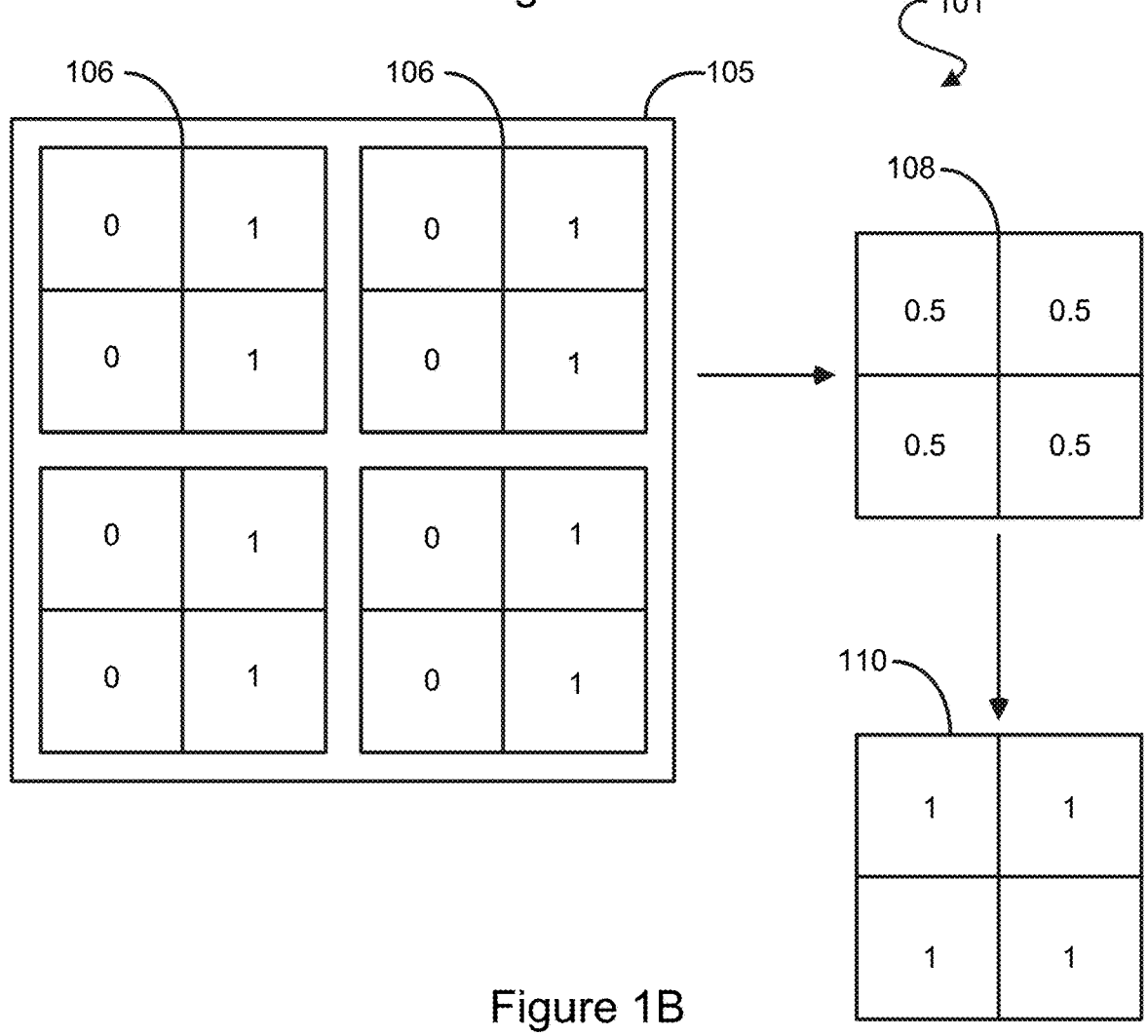
FIG. 1B shows a diagram of binning pixel intensities from four 2×2 pixel arrays to a single 2×2 pixel array, along with corresponding numerical values indicative of pixel intensity for each pixel, according to embodiments.

FIG. 1A shows a diagram 100 of a process of binning pixel intensity from an 2×2 pixel array 102 to an single superpixel 104. The resulting single pixel 104 has a numerical value represented as P, which is the weighted average of each pixel intensity (i.e., upper left (UL), upper right (UR), bottom left (BL), and bottom right (BR)) of the 2×2 pixel array 102. For example, the weighted average is represented as $$p = \frac{w_{UL} p_{UL} + w_{BL} p_{BL} + w_{UR} p_{UR} + w_{BR} p_{BR}}{w_{UL} + w_{BL} + w_{UR} + w_{BR}},$$

where $w_{xy}$ is the weight of pixel xy and $p_{xy}$ is the intensity of pixel xy. When rounding numerical values of the pixel intensity up or down, the weighted average pixel intensity of the 2×2 pixel array 102 may not be consistent with the weighted average pixel intensity of the binned single pixel 104. For example, FIG. 1B shows a diagram 101 of binning pixel intensity from four 2×2 pixel arrays 106 of a single 4×4 pixel array 105 to a single 2×2 pixel array 108, along with corresponding numerical values indicative of pixel intensity for each pixel. When averaging each 2×2 pixel array 106, the 2×2 pixel array 108 shows that the weighted average of each 2×2 pixel array 106 is 0.5. When using the conventional method for averaging, a pixel intensity of greater than or equal to 0.5, the pixel intensity is rounded to up while a pixel intensity of less than 0.5, the pixel intensity is rounded to down. The conventional method does not accurately maintain the weighted average pixel intensity throughout binning. For example, using the conventional method in FIG. 1B by rounding a pixel intensity of 0.5, with all values below 0.5 rounded down and values 0.5 and higher rounded up, the resulting rounded value is 1. The 2×2 pixel 110 shows a resulting rounded value for each pixel is 1. The difference in the resulting weighted average of 2×2 pixel 110, with each pixel intensity of 1, is different than the weighted average pixel intensity of each 2×2 pixel 106 of 0.5.

Figure 2:
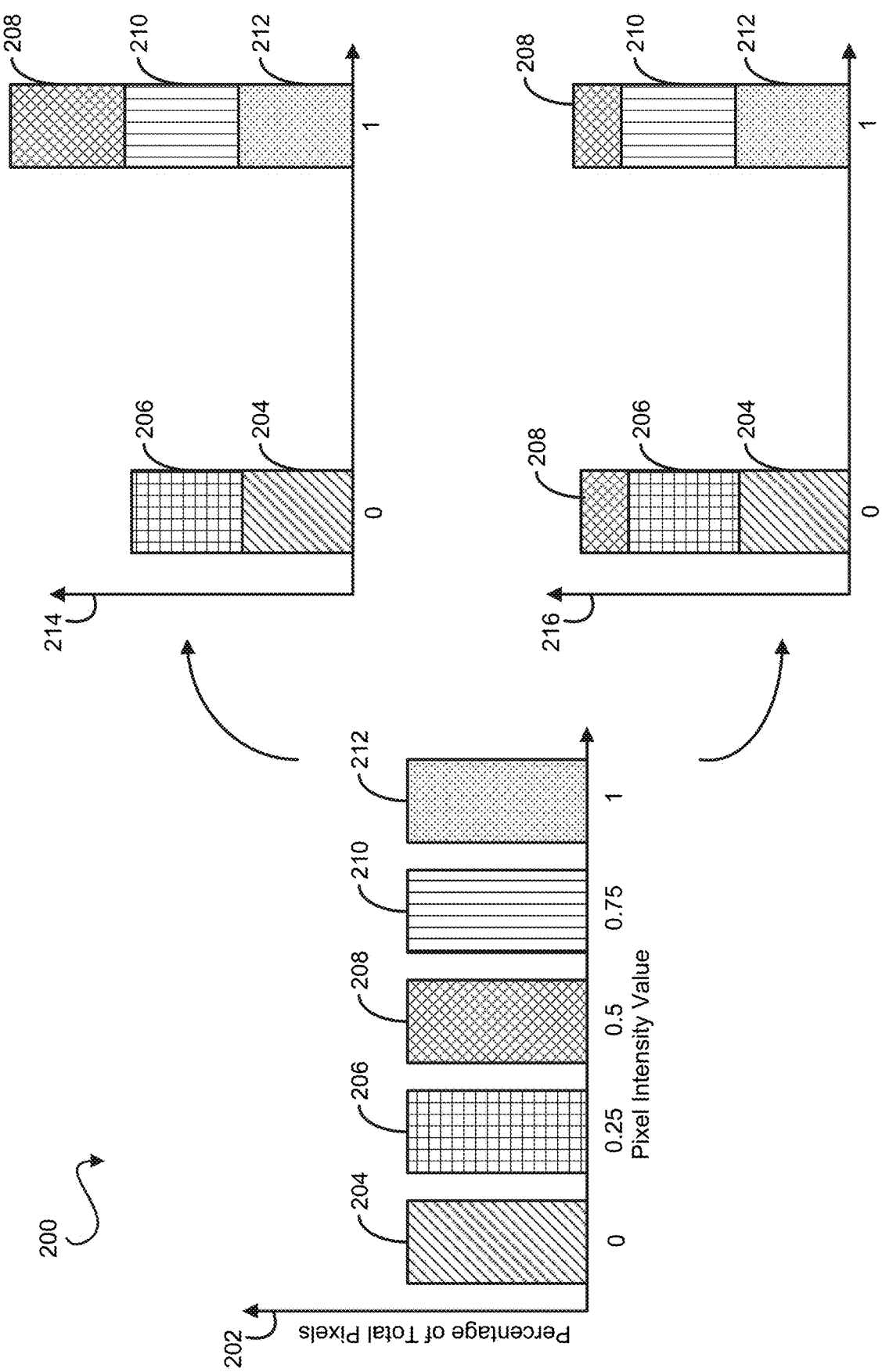
FIG. 2 depicts a diagram of binning a uniform pixel distribution using a rounding algorithm, according to embodiments.

The present embodiments solve this discrepancy between pre-binned pixel intensity and post-binned pixel intensity by rounding each pixel intensity of a certain numerical value (e.g., 0.5) alternating between rounding up and down, thereby retaining the average weighted pixel intensity of the initial N×N pixel. FIG. 2 depicts a diagram 200 of an initial uniformly distributed graph 202 of the percentage of each pixel in relation to total pixels and various pixel intensities, including a first pixel 204 with pixel intensity 0, a second pixel 206 with pixel intensity 0.25, a third pixel 208 with pixel intensity 0.5, a fourth pixel 210 with pixel intensity 0.75, and a fifth pixel 212 with pixel intensity 1. In embodiments, each pixel 204-212 may represent larger groups of pixels, such as a group of 32 pixels, 64 pixels, and so on. When transforming using the conventional method, the resulting graph 214 shows a weighted average pixel intensity of 0.6, a difference of 0.1 from the weighted average pixel intensity of graph 202. This is because the numerical values of pixels below 0.5 are rounded down to 0, while the numerical values of pixels greater than or equal to 0.5 are rounded to 1. The conventional method results in the third pixel with a pixel intensity of 0.5 being rounded to 1.

However, using the present embodiments, graph 216 shows how the weighted value of the third pixel 208 may be split, rounding half the value to one and the other half to zero. The weighted average value from using the present embodiments of graph 216 results in a value (0.5) equal to the weighted average value of the pixel intensities of pixels 202-212, shown in graph 202. In embodiments, the number of pixels that are equal to 0.5 may be any number (e.g., four pixels, nine pixels, sixteen pixels, fifteen pixels, thirty two pixels, and the like) greater than zero, and the pixel intensities are rounded up to 1 or down to 0 using any type of numerical sequence such as sequences generated using a random number generator, a flip-flop, and the like. For example, there may be four pixels, each with corresponding pixels intensity of 0.5, two of the pixel intensities will round down to zero while the other two pixel intensities will round up to one. Continuing the example, the numerical sequence may include a flip-flop sequence, where a first pixel intensity of 0.5 is rounded down to zero, a second pixel intensity of 0.5 is rounded up to one, a third pixel intensity of 0.5 is rounded down to zero, and a fourth pixel intensity of 0.5 is rounded up to one. Alternatively, the present embodiments may employ a random number generator, where each pixel intensity of 0.5 is randomly rounded up to 1 or rounded down to 0, such that half of the pixel intensities are rounded up to 1 and the other half is rounded down to 0.

Figure 3:
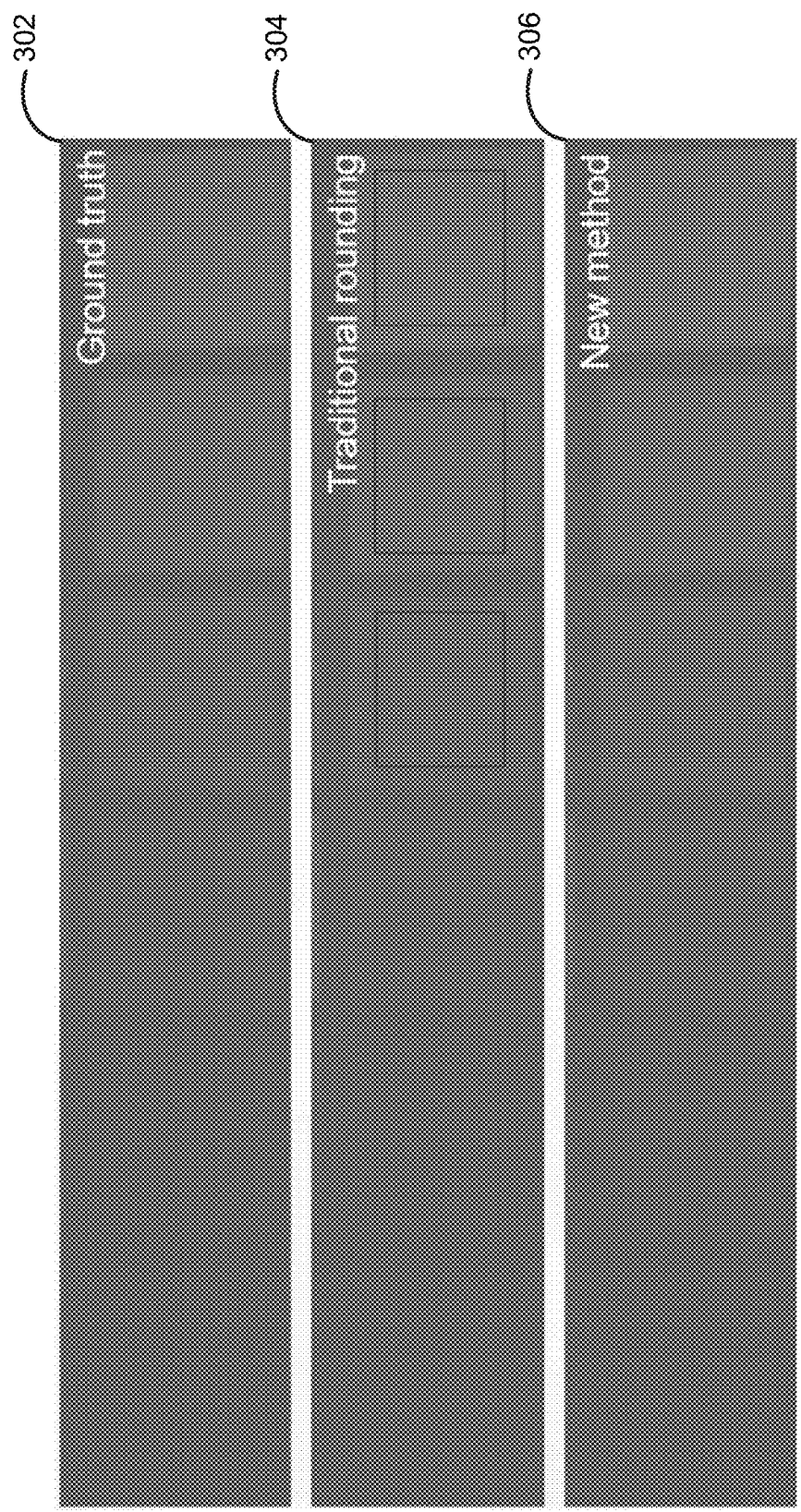
FIG. 3 shows a gray scale of various pixel intensities using various methods, according to embodiments.

FIG. 3 shows a gray-scale gradation of various pixel intensities post-binning. Ground truth 302 illustrates a true numerical value of pixel intensities after binning, where the pixel intensity for each pixel of a post-binned pixel array is consistent with the pre-binned pixel array. Traditional rounding 304 illustrates pixel intensities at various gray-scale values when the conventional method is used to bin an N×N pixel array, as discussed above with reference to FIG. 1. The new method 306 illustrates post-binning of an N×N pixel array using the present embodiments. The new method 306 more closely resembles consistent pixel intensities with the ground truth 302 than the traditional rounding 304.

Figure 4:
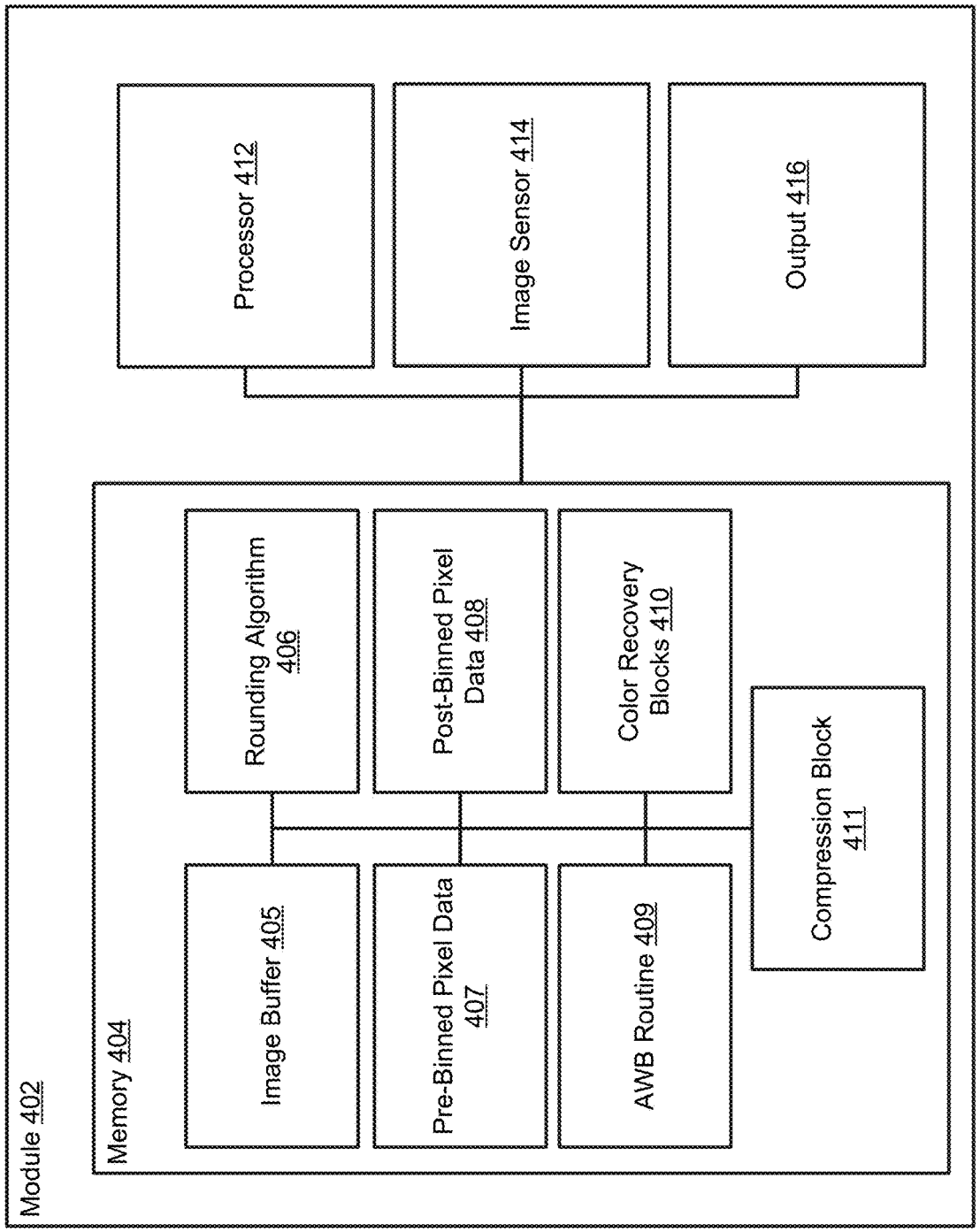
FIG. 4 depicts a computing system that implements the present embodiments, according to embodiments.

FIG. 4 depicts a module 402 that implements the present embodiments. In embodiments, module 402 includes memory 404, processor 412, image sensor 414, and output 416. In embodiments, module 402 may not include each of the components, 404, 412, 414, but is electrically connected with each component. Memory 404 may be communicatively coupled to the processor 412, the memory 404 further including an image buffer, a rounding algorithm 406 represented digitally as machine-readable instructions that, when executed by processor 412, causes the processor 412 to implement the rounding algorithm 406, that includes receiving the pre-binned pixel data 408, performing the rounding algorithm 406 on the pre-binned data 408, and outputting post-binned pixel data 410. For example, the pre-binned pixel data 408 includes pixel intensities (e.g., the pixel intensities as shown in graphs 804, with reference to FIGS. 8A, B) corresponding to pixels of an N×N pixel array (e.g., the region of interest 802, with reference to FIGS. 8A, B) and the post-binned pixel data 410 (e.g., the pixel intensity as shown in graph 808) includes pixel intensities. Further, the rounding algorithm 406 rounds half, or approximately half, of the pixel intensities, with a decimal value of 0.5, from the pre-binned pixel data 408 to zero, while rounding the other half, or approximately half, of the pixel intensities to one. The rounding algorithm 406 may be any algorithm, including a random-number generator, flip-flop, and the like. In some embodiments, the rounding algorithm 406 may be hardware implemented.

Memory 404 further includes an automatic white balance (AWB) routine 409, a color recovery blocks 410, and compression block 411. The AWB routine 409 may perform auto-white balance on the post-binned pixel data 408, by adjusting the pixel intensities so that a more natural color is present at output 416. The compression block 411 may compress the post-binned pixel data to remove background noise, optimize memory allocation, and the like.

The processor 412 receives the pre-binned pixel data 408 from the image sensor 414 (e.g., after the image sensor captures an image), and then may store the pre-binned pixel data 408 within memory 404. The processor 412 may transmit post-binned pixel data 410 to output 416 for display, e.g., within a graphical user interface of a client device, such as a smart device, camera, and the like.

In embodiments, bit-width reduction may occur within the module 402, such as processor 412. For example, the image sensor 414 may include a 10-bit analog-to-digital converter (ADC), the converted pixel intensities of which are scaled by subtraction of full dark values. The 10-bit representation of the pixel intensities may be stored within the pre-binned pixel data 408 and then rounded (according to the present embodiments) to reduce it to 8 bit values, averaged, then stored in the post-binned pixel data.

Figure 5:
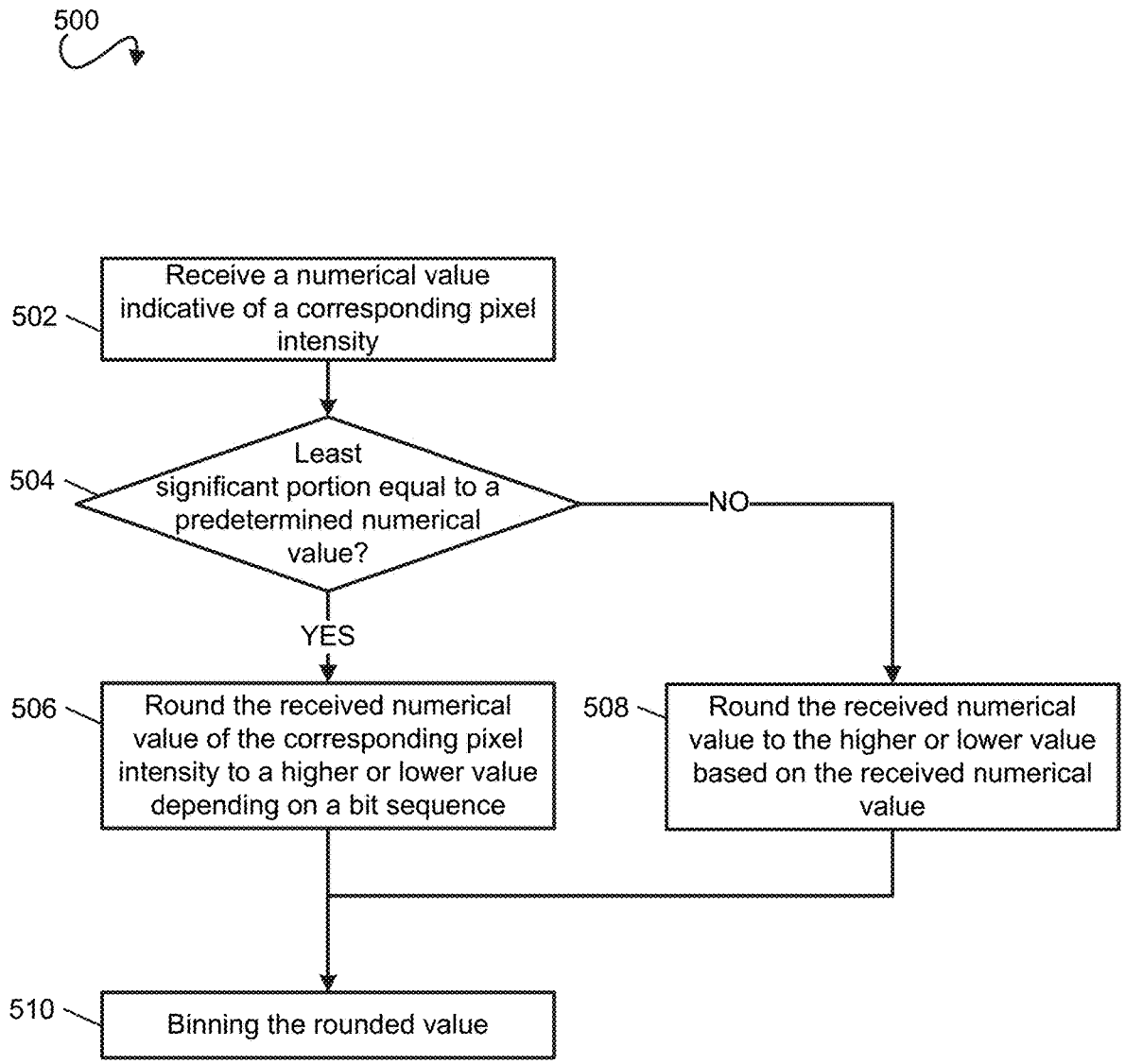
FIG. 5 is a flowchart illustrating a method for maintaining a weighted average pixel intensity when binning an N×N pixel array, according to embodiments.
Figure 6A:
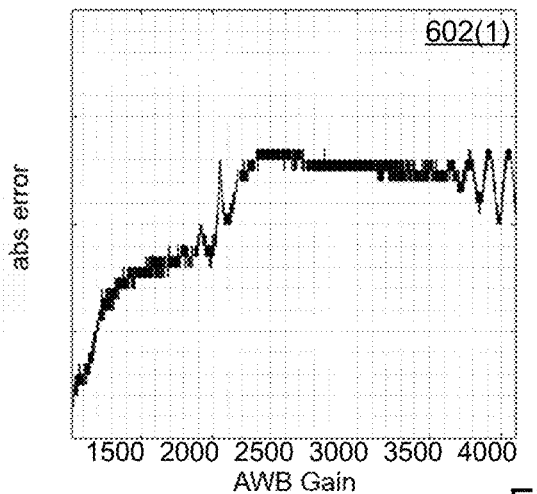
FIGS. 6A-6F show graphs at various gray-scale intensities, each illustrating the average value error as a function of automatic white balance, a first graph using a conventional method and a second graph using the present embodiments, according to embodiments.
Figure 6A:
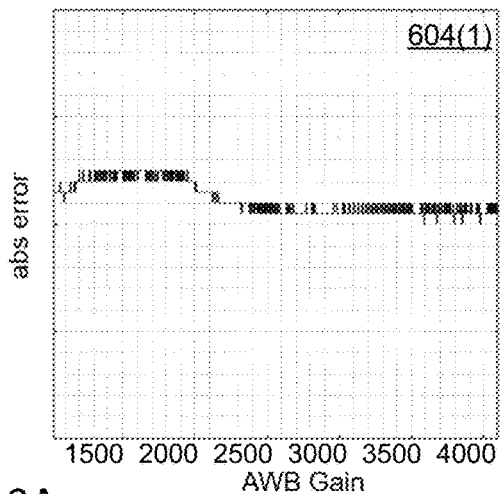
Figure 6B:
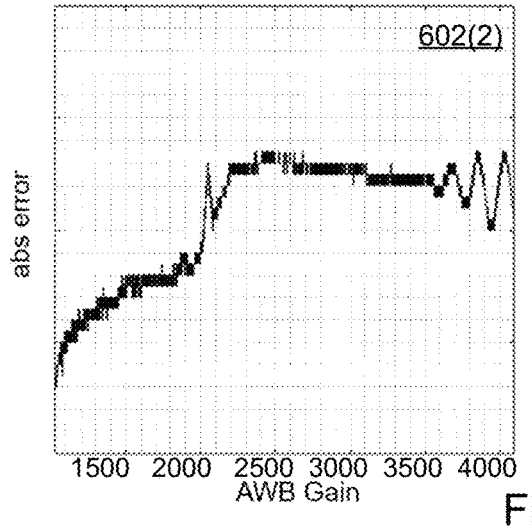
Figure 6B:
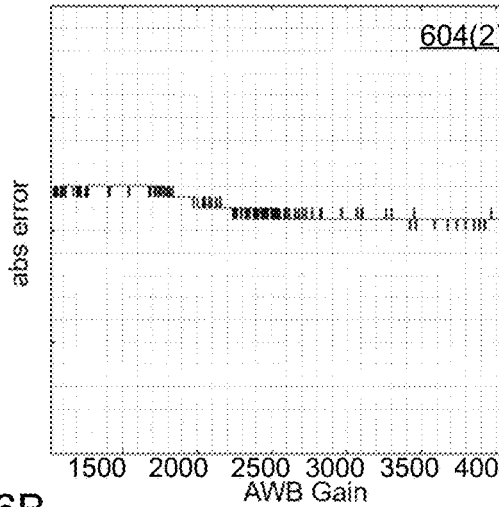
Figure 6C:
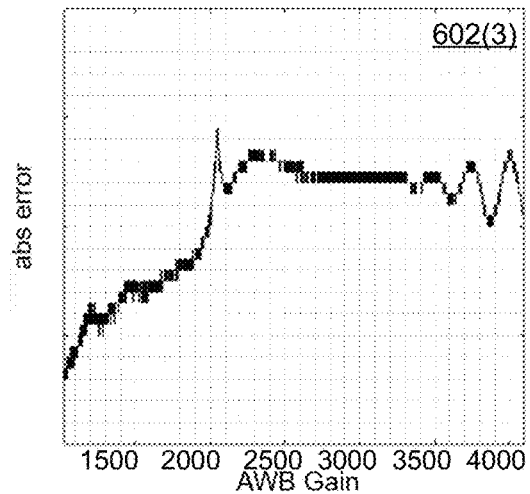
Figure 6C:
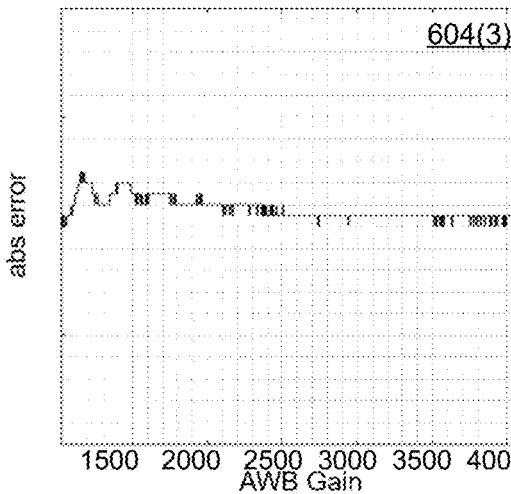
Figure 6D:
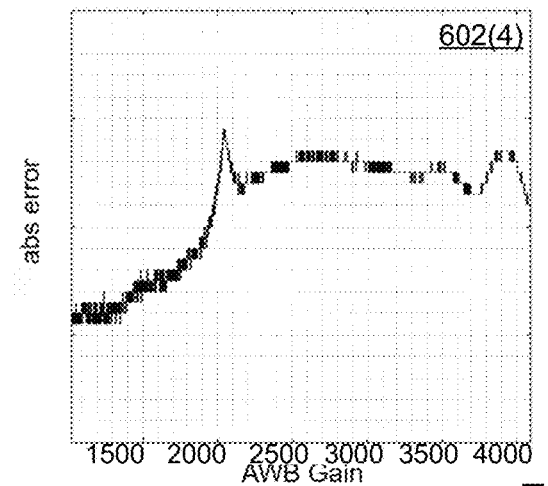
Figure 6D:
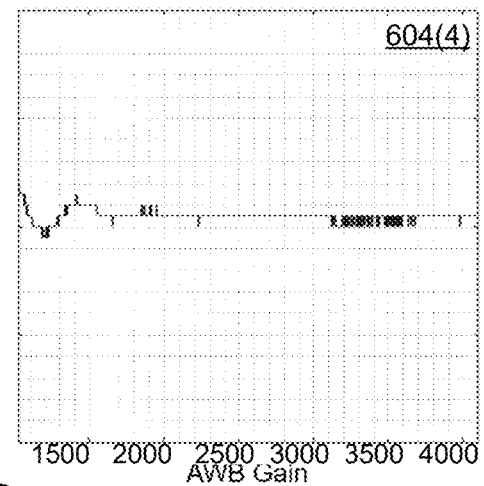
Figure 6E:
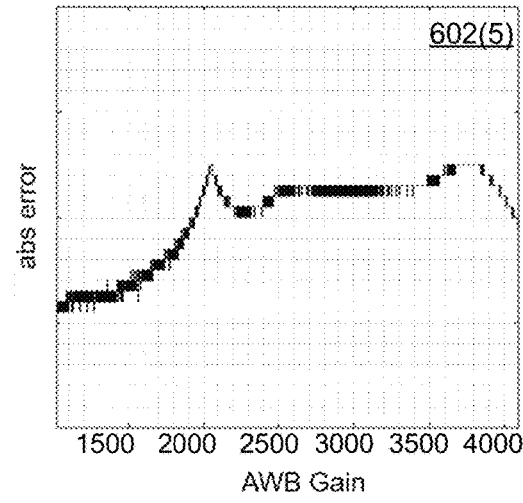
Figure 6E:
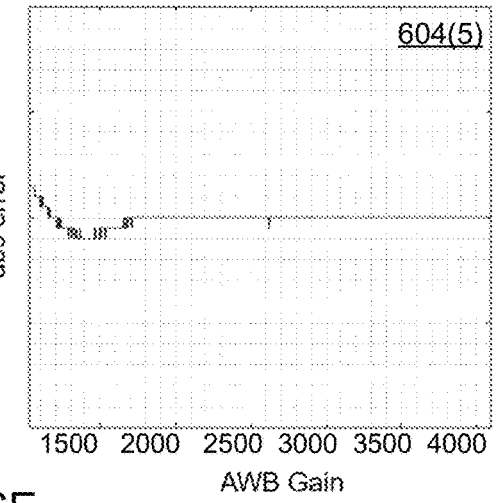
Figure 6F:
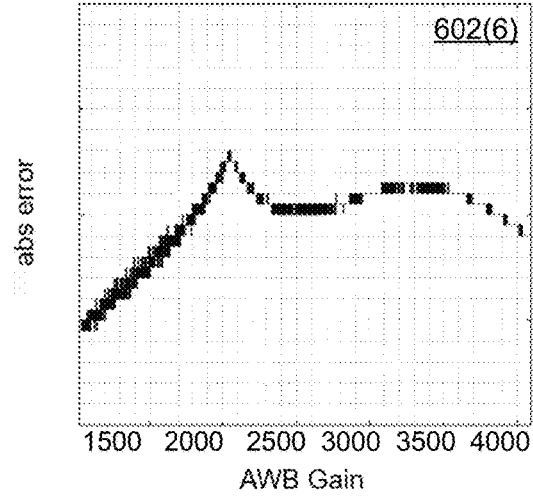
Figure 6F:
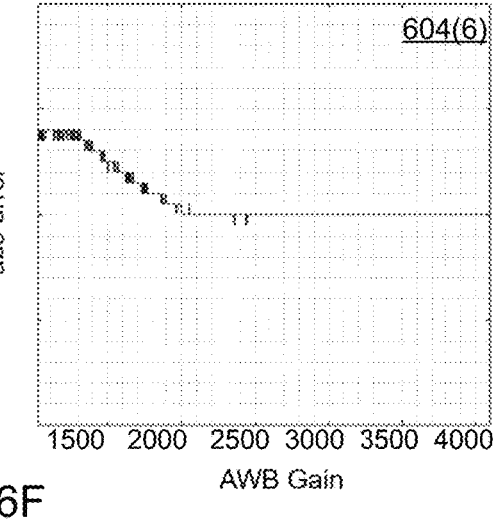
Figure 8A:
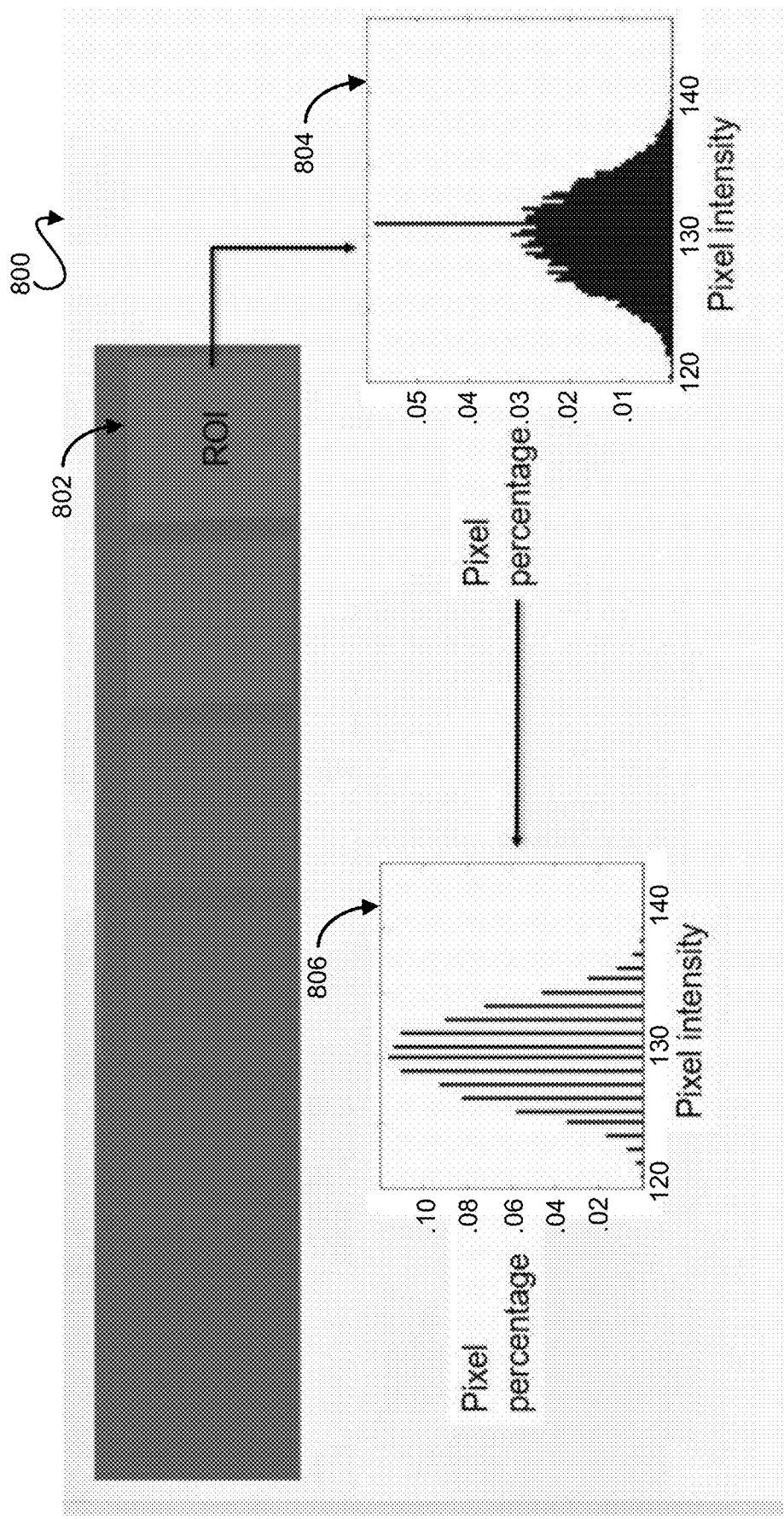
FIGS. 8A, 8B illustrate binning gray-scale pixel intensities using the conventional method versus using the present embodiments, according to embodiments.

FIG. 5 is a flowchart illustrating a method 500 for maintaining a weighted average pixel intensity when binning an N×N pixel array. Method 500 may be implemented by processor (e.g., processor 412) that is communicatively coupled to memory (e.g., memory 404) represented as machine-readable instructions that, when executed by the processor, cause the processor to implement the rounding algorithm (e.g., rounding algorithm 406 stored within memory 404). Method 500 includes receiving (502) a numerical value indicative of a corresponding pixel intensity read from an image sensor, such as image sensor 414. In one example of block 502, processor receives pixel intensities of corresponding pixels of an N×N pixel array captured by image sensor 414, and stores the received pixel intensities within memory (e.g., in pre-binned pixel data 408 of memory 404). In one example of block 502, the received pixel intensities may be similar to the pixel intensities, represented as digital numbers, as shown in graph 804 (FIG. 8A, B).

Method 500 further includes determining (504) whether a least significant portion of the received numerical value of the corresponding pixel intensity is equal to a predetermined numerical value (e.g., 0.5, and the like). In one example of block 504, the processor selects and then counts the total number of pixel intensities equal to 0.5. For example, the processor may count the number of pixel intensities having a least significant value of 0.5.

If the processor determines the least significant portion is equal to the predetermined value (Decision: "YES"), method 500 includes rounding (506) the received numerical value of the corresponding pixel intensities to either a lower or higher value. In one example of block 506, the rounding to either the lower or higher value may depend on a bit sequence. In one example of block 506, the rounding may be according to a numerical sequence (e.g., a random number generator, flip-flop, and the like). In one example of block 506, the processor rounds the least significant portion of the received numerical value below 0.5 to a least significant value of zero and rounds the least significant values above 0.5 to one.

However, if the processor determines the least significant portion is not equal to the predetermined value (Decision: "NO"), method 500 continues with rounding (508) the received numerical value to the higher or lower value based on the received numerical value. Method 500 further includes binning (510) the rounded numerical values from blocks 506, 508 of the corresponding pixel intensities. In one example of block 510, the processor may store the binned values in memory (e.g., post-binned pixel data 410 of memory 402). In one example of block 510, the processor may invoke output 416 to display the post-binned pixel data (e.g., post-binned pixel data 410) within a graphical user interface of a client device (e.g., a smart phone, tablet, laptop, camera, and the like).

FIGS. 6A-F each show two graphs illustrating the average value error as a function of automatic white balance gain, a first graph 602(1)-(6) using a conventional method and a second graph 604(1)-(6) using the present embodiments. For example, graphs 602(1)-(6) and 604(1)-(6) show absolute value errors for average pixel intensities of 71.59, 69.84, 67.92, 66.15, 65.06, 64.02, respectively. Graphs 602(1)-(6) and 604(1)-(6) use real-world data to depict the difference between the conventional method and the rounding algorithm. Graph 602(1)-(6) illustrates the average value error at various intensities versus the auto-white balance (AWB) gain using the conventional method, as described with reference to FIG. 1. For example, the average value error is the difference between the weighted-average pixel intensities before rounding and after rounding using the conventional method. Each graph 602(1)-(6) shows an average value error, after using the conventional method, with an absolute value of 0.1 until roughly 2000 auto-white balance gain, and then roughly 0.05 absolute value error thereafter.

Graphs 604(1)-(6) illustrates the average error value at corresponding intensities versus the AWB gain using the present embodiments, illustrating a noticeably lower average error in comparison to the conventional method. Graphs 604(1)-(6) show the present embodiments compress the average value error substantially, in comparison to the conventional method shown in graphs 602(1)-(6). For example, the average value error has an absolute value of roughly zero for much of graphs 602(1)-(6).

FIG. 7 illustrates a table 700 of exemplary data expressed as various floating-point numbers such as pre-binned pixel data 407, and corresponding output of a counter that counts the number of values with a least significant digit of 0.5; the output of the rounding algorithm; and the final output value (e.g., either zero or one for values with a significant digit of 0.5). For example, the floating values are 65.25, 65.75, 66.5, 64.5, 65.00, 66.00, 65.00, 67.75, 67.5, 67.25, 64.5, 65.00, 65.25, 65.70, 64.5, 65.75, 64.25, 63.5, which may form the pre-binned pixel data 407. The rounding algorithm (e.g., rounding algorithm 406) may begin counting the number of floating numbers with portions to the right of the decimal point values equal to 0.5, that include 66.5, 64.5, 67.5, 64.5, 64.5, and 63.5. Table 700 further shows the corresponding rounded value for each floating number with a decimal value of 0.5. For example, the rounded value outputted is shown in the output s[n] row as either "0" or "1". The rounded values are determined according to the rounding algorithm, implementing a numerical sequence (i.e., s[n], as shown in FIG. 7), such as a random number generator, flip-flop, and the like. The final output row shows the rounded values of the floating numbers in a final form, e.g., 66, 65, 67, 65, 64, and 64.

The present embodiments are not limited to floating-point numbers but include scaled-integer rounded-truncation as discussed with reference to FIG. 4, floating point with mantissa and exponent, and so on. The present embodiments may be applied after truncating the following set of values, {50.55, 40.65, 70.55}, to the leading N decimal digit, such as N=1, arriving at the following truncated set of values, {50.5, 40.6, 70.5}. Applying the present embodiments to the truncated set results in the set, {50, 41, 71}, with a weighted-average value of 54; whereas applying the conventional method to the truncated set of values results in the set, {51, 41, 71}, with a weighted-average value of 54.3.

FIG. 8A illustrates a diagram 800 of a region of interest (ROI) 802 from various grey-scale intensities (as shown in FIG. 3). Diagram 800 is shown using the conventional method of rounding all decimal values of pixel intensities of 0.5 to one. Graph 804 shows binned pixel intensities of the ROI 802 and the percentage of the binned pixel intensities. The pixel intensities are represented as a scaled-integer digital number (DN), each DN having 10 bits (i.e., 0 DN-1023 DN). The weighted-average pixel intensity is 130.16. Graph 806 shows the binned pixel intensities and the percentage of the binned intensities after the conventional method is implemented when rounding during truncation to 10 bits. Before and after binning, the data is all 10-bit. The ROI 802 has 2 N×2 N pixels and each 2×2 pixels are binned into a superpixel. So the intermediate binning result is 12 bit and is then rounded, during truncation, to 10 bits. The weighted-average pixel intensity is 130.28. The percentage of pixel intensity values that are rounded up is 49.015% (including 24.546% of pixels whose decimal value is 0.5). The percentage of unchanged pixel intensities is 25.951%.

The percentage of pixel intensities that are rounded down is 25.034%. The difference between the weighted-average pixel intensities before and after implementing the conventional method is 0.12.

Figure 8B:
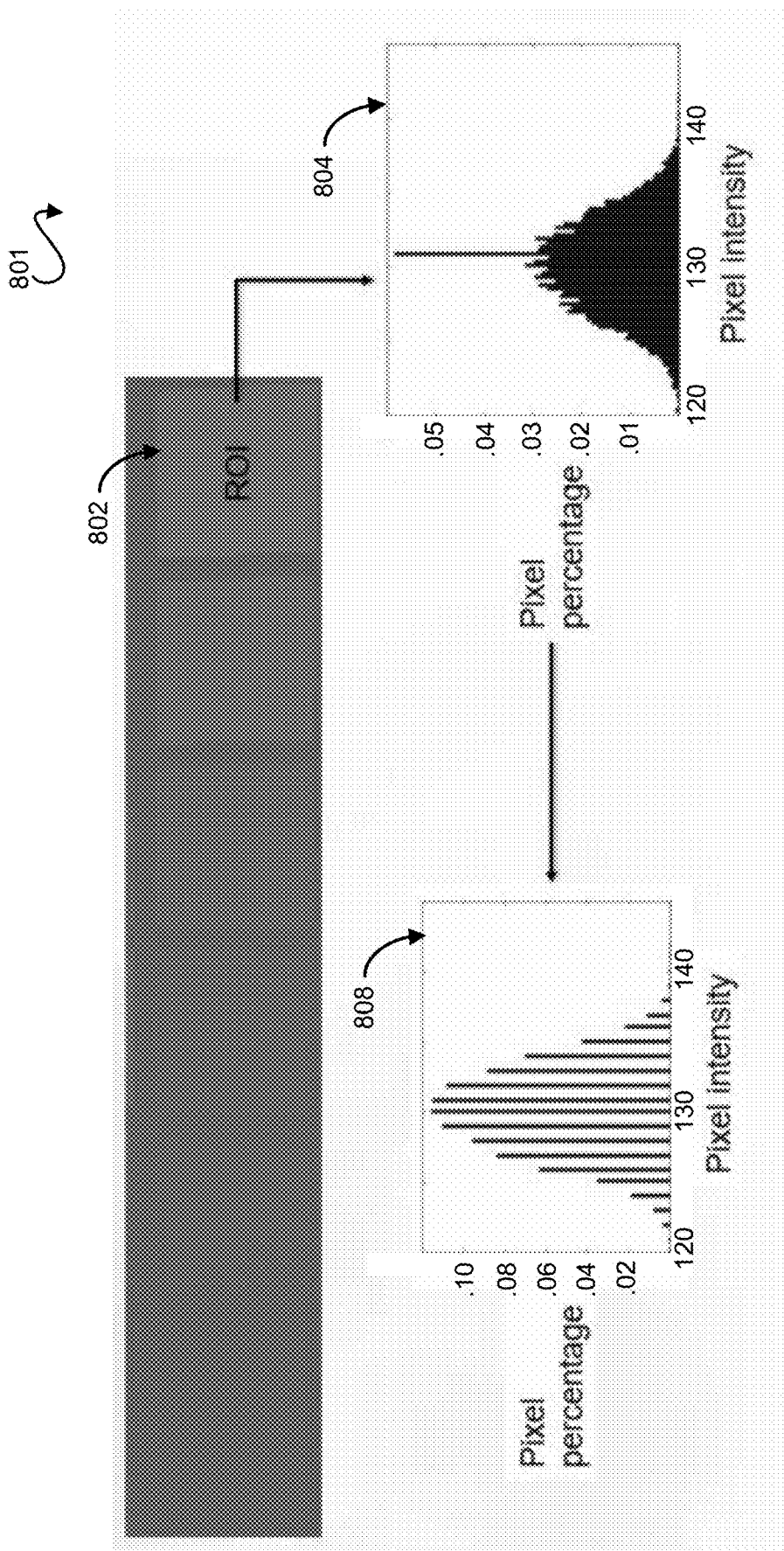

FIG. 8B illustrates a diagram 801 of ROI 802 from various grey-scale intensities. Diagram 801 is shown using the present embodiments for rounding all decimal values of pixel intensities of 0.5 to one and approximately the other half to zero. Graph 804 shows the binned pixel intensities of the ROI 802 and the percentage of the binned pixel intensities, with the weighted-average pixel intensity of 130.16. Graph 808 shows the binned pixel intensities and the percentage of the binned intensities after the implementing the present embodiments, such as the rounding algorithm 406. After implementing the present embodiments, the weighted-average pixel intensity of graph 808 is 130.16, which is equal to the weighted-average of pixel intensities of graph 804, before rounding. The percentage of pixel intensity values that are rounded up is 36.747% (including 12.268% pixel whose decimal value is 0.5). The percentage of unchanged pixel intensities is 25.951%. The percentage of pixel intensities that are rounded down is 37.302% (including 12.268% pixel whose decimal value is 0.5). Therefore, the percentage of pixel intensities with a decimal value of 0.5 rounded up to one is roughly equal to those rounded down to zero. The difference between the weighted-average pixel intensity before implementing the conventional rounding method is 0.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

The following embodiments are specifically contemplated, as well as any combinations of such embodiments that are compatible with other another:

(A) An image sensor processor implemented method for retaining pixel intensity, comprising: receiving, by the image processor, a numerical value indicative of a corresponding pixel intensity read from an image sensor; determining, by the image processor, whether a least significant portion of the received numerical value is equal to a predetermined numerical value; and responsive to determining the least significant portion of the received numerical value is equal to the predetermined numerical value, rounding, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and storing, by the image processor, the rounded value.

(B) In the embodiment denoted by (A), wherein the rounding the received numerical value of the corresponding pixel intensity to the higher or lower value depending on the bit sequence is according to a numerical sequence.

(C) In the embodiments denoted by either (A) or (B), wherein the numerical sequence is provided by a random number generator.

(D) In any of the embodiments denoted by (A)-(C), wherein the numerical sequence is a flip-flop sequence of alternating values, where approximately half the numerical values are rounded to the lower value and approximately the other half of the numerical values are rounded to the higher value.

(E) In any of the embodiments denoted by (A)-(D), wherein the predetermined numerical value is a least significant value of 0.5.

(F) A camera system, comprising a module that includes an image sensor processor, a memory communicatively coupled with the image sensor processor, the memory storing machine-readable instructions that, when executed by the image sensor processor, cause the image sensor processor to: receive, by the image processor, a numerical value indicative of a corresponding pixel intensity; determine, by the image processor, whether a least significant portion of the received numerical value is equal to a predetermined numerical value; responsive to determining the least significant portion of the received numerical value is equal to the predetermined numerical value, round, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and store, by the image processor, the rounded value.

(G) In the embodiment denoted by (F), wherein the rounding the received numerical value of the corresponding pixel intensity to the higher or lower value depending on the bit sequence is according to a numerical sequence.

(H) In the embodiments denoted by either (F) or (G), wherein the numerical sequence is provided by a random number generator.

(I) In any of the embodiments denoted by (F)-(H), wherein the numerical sequence is a flip-flop sequence of alternating values, where approximately half the numerical values are rounded to the lower value and approximately the other half of the numerical values are rounded to the higher value.

(J) In any of the embodiments denoted by (F)-I), wherein the predetermined numerical value is a least significant value of 0.5.

(K) An image sensor processor implemented method for retaining pixel intensity, comprising: receiving, by an image processor, a set of numerical values indicative of corresponding pixel intensities read from an image sensor; binning, by the image processor, by a method comprising rounding the set of numerical values according to a rounding algorithm further comprising: determining, by the image processor, for each numerical value, whether a least significant portion of each numerical value is equal to a predetermined numerical value; and responsive to determining the least significant portion of each numerical value is equal to the predetermined numerical value, rounding, by the image processor, each numerical value of the corresponding pixel intensities to a higher or lower value depending on a bit sequence, and if the least significant portion of the numerical value is not equal to the predetermined value, rounding the numerical value to the higher or lower value based on the numerical value; and averaging the rounded numerical values to produce binned values; and storing, by the image processor, the binned values.

(L) In the embodiment denoted by (K), wherein the rounding each received numerical value of the corresponding pixel intensities to the higher or lower value depending on the bit sequence is according to a numerical sequence.

(M) In the embodiments denoted by either (K) or (L), wherein the numerical sequence is provided by a random number generator.

(N) In any of the embodiments denoted by (K)-(M), wherein the numerical sequence is a flip-flop sequence of alternating values, where approximately half the numerical values are rounded to the lower value and approximately the other half of the numerical values are rounded to the higher value.

(O) In any of the embodiments denoted by (K)-(N), wherein the predetermined numerical value is a least significant value of 0.5.

What is claimed is:

1. An image sensor processor implemented method for retaining pixel intensity, comprising:
receiving, by an image processor, a numerical value indicative of a corresponding pixel intensity read from an image sensor;
determining, by the image processor, whether a least significant portion of the received numerical value is equal to a predetermined numerical value; and
responsive to determining the least significant portion of the received numerical value is equal to the predetermined numerical value, rounding, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and
storing, by the image processor, the rounded value.

2. The method of claim 1, wherein the rounding the received numerical value of the corresponding pixel intensity to the higher or lower value depending on the bit sequence is according to a numerical sequence.

3. The method of claim 2, wherein the numerical sequence is provided by a random number generator.

4. The method of claim 2, wherein the numerical sequence is a flip-flop sequence of alternating values, where approximately half the numerical values are rounded to the lower value and approximately the other half of the numerical values are rounded to the higher value.

5. The method of claim 1, wherein the predetermined numerical value is a least significant value of 0.5.

6. A camera system, comprising a module that includes an image sensor processor, a memory communicatively coupled with the image sensor processor, the memory storing machine-readable instructions that, when executed by the image sensor processor, cause the image sensor processor to:
receiving, by the image processor, a numerical value indicative of a corresponding pixel intensity read from an image sensor;
determining, by the image processor, whether a least significant portion of the received numerical value is equal to a predetermined numerical value; and
responsive to determining the least significant portion of the received numerical value is equal to the predetermined numerical value, rounding, by the image processor, the received numerical value of the corresponding pixel intensity to a higher or lower value depending on a bit sequence, and if the least significant portion of the received numerical value is not equal to the predetermined value, rounding the received numerical value to the higher or lower value based on the received numerical value; and
storing, by the image processor, the rounded value.

7. The camera system of claim 6, wherein the rounding the received numerical value of the corresponding pixel intensity to the higher or lower value depending on the bit sequence is according to a numerical sequence.

8. The camera system of claim 7, wherein the numerical sequence is provided by a random number generator.

9. The camera system of claim 7, wherein the numerical sequence is a flip-flop sequence of alternating values, where approximately half the numerical values are rounded to the lower value and approximately the other half of the numerical values are rounded to the higher value.

10. The camera system of claim 6, wherein the predetermined numerical value is a least significant value of 0.5.

11. An image sensor processor implemented method for retaining pixel intensity, comprising:
receiving, by an image processor, a set of numerical values indicative of corresponding pixel intensities read from an image sensor;
binning, by the image processor, by a method comprising rounding the set of numerical values according to a rounding algorithm further comprising:
determining, by the image processor, for each numerical value, whether a least significant portion of each numerical value is equal to a predetermined numerical value; and
responsive to determining the least significant portion of each numerical value is equal to the predetermined numerical value, rounding, by the image processor, each numerical value of the corresponding pixel intensities to a higher or lower value depending on a bit sequence, and if the least significant portion of the numerical value is not equal to the predetermined value, rounding the numerical value to the higher or lower value based on the numerical value; and
averaging the rounded numerical values to produce binned values; and
storing, by the image processor, the binned values.

12. The image sensor processor implemented method of claim 11, wherein the rounding each received numerical value of the corresponding pixel intensities to the higher or lower value depending on the bit sequence is according to a numerical sequence.

13. The image sensor processor implemented method of claim 12, wherein the numerical sequence is provided by a random number generator.

14. The image sensor processor implemented method of claim 12, wherein the numerical sequence is a flip-flop sequence of alternating values, where approximately half the numerical values are rounded to the lower value and approximately the other half of the numerical values are rounded to the higher value.

15. The image sensor processor implemented method of claim 11, wherein the predetermined numerical value is a least significant value of 0.5.

* * * * *